(12) United States Patent
Yeh et al.

(10) Patent No.: US 8,238,490 B2
(45) Date of Patent: Aug. 7, 2012

(54) METHOD AND CIRCUIT FOR DETERMINING A DOPPLER SHIFT OF A SIGNAL

(75) Inventors: Hsin-Chung Yeh, Hsinchu (TW); Kuan-I Li, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 699 days.

(21) Appl. No.: 12/392,325

(22) Filed: Feb. 25, 2009

(65) Prior Publication Data

US 2010/0214172 A1    Aug. 26, 2010

(51) Int. Cl.
*H04L 27/06*    (2006.01)

(52) U.S. Cl. ........ 375/343; 375/142; 375/145; 375/149; 375/150; 375/316; 375/326; 375/340; 375/342; 375/354; 370/503; 370/508; 370/509; 370/510; 370/511; 370/512; 370/513; 370/514; 342/357.62; 342/357.63; 342/357.68; 342/357.69; 342/357.78; 342/378; 327/141; 455/502

(58) Field of Classification Search .............. 375/142, 375/143, 145, 147, 149, 150, 152, 316, 340, 375/343, 354, 326, 342; 342/378, 357.62, 342/357.63, 357.68, 357.69, 357.78; 327/141; 370/503, 508, 509, 510, 511, 512, 513, 514; 455/502

See application file for complete search history.

(56) References Cited

U.S. PATENT DOCUMENTS

| | | | | |
|---|---|---|---|---|
| 7,391,366 | B2 * | 6/2008 | Park et al. | 342/357.59 |
| 7,634,033 | B1 * | 12/2009 | Giallorenzi et al. | 375/350 |
| 7,639,181 | B2 * | 12/2009 | Wang et al. | 342/357.59 |

\* cited by examiner

*Primary Examiner* — Leon Flores
(74) *Attorney, Agent, or Firm* — Thomas|Kayden

(57) ABSTRACT

A method for determining a Doppler shift of a first signal is provided. First, a plurality of Doppler frequency hypotheses is combined to obtain a joint Doppler signal. The first signal is the correlated according to the joint Doppler signal and a plurality of code signals with phases corresponding to a series of code phase hypotheses to obtain a series of correlation results which are then examined to determine whether the Doppler shift does lie in the Doppler hypotheses. A fine Doppler search is then performed to determine the Doppler shift when the Doppler shift lies in the Doppler hypotheses.

18 Claims, 7 Drawing Sheets

METHOD AND CIRCUIT FOR DETERMINING A DOPPLER SHIFT OF A SIGNAL

BACKGROUND OF THE INVENTION

1. Field of the Invention

The invention relates to signal processing, and more particularly to Doppler wipe-off of signals.

2. Description of the Related Art

Before a transmitter sends a segment of data to a receiver, the transmitter modulates the signal according to a code to obtain a signal suitable for transmission. When a receiver receives the signal, the receiver must therefore remove the code from the received signal to recover the original data. The receiver must synchronize the phase of the local code with that of the remote code of the transmitter, and then the original data can be correctly recovered according to the local code with the synchronized phase. The receiver therefore must search a lot of code phase hypotheses for the correct phase of the local code before the original data are decoded.

In addition, before the transmitted signal arrives at the receiver, the signal has propagated through a transmission path and may suffer from distortion due to Doppler frequency shift in the transmission path, transmitter and receiver dynamics, or clock drift and clock bias. The receiver therefore must estimate a Doppler frequency shift of the received signal and compensate the received signal for the Doppler frequency shift before the received signal is further processed. The receiver therefore must also search a lot of Doppler shift hypotheses for the correct Doppler frequency shift of the received signal before the received signals are processed.

Assume that the incoming signal uncertainty is divided into N code phase hypotheses and M Doppler shift hypotheses. The N code phase hypotheses and M Doppler shift hypotheses forms the N×M combined hypotheses. Searching N×M combined hypotheses, however, is time consuming, delaying subsequent signal decoding and degrading system performance of the receiver. A circuit determining the Doppler shift and the code phase with a rapid speed is therefore required to improve the system performance of the receiver.

BRIEF SUMMARY OF THE INVENTION

A method for determining a Doppler shift of a first signal is provided. First, a plurality of Doppler frequency hypotheses is combined to obtain a joint Doppler signal. The first signal is then correlated according to the joint Doppler signal and a plurality of code signals with phases corresponding to a series of code phase hypotheses to obtain a series of correlation results which are then examined to determine whether the Doppler shift does lie in the Doppler hypotheses. A fine Doppler search is then performed to determine the Doppler shift when the Doppler shift lies in the Doppler hypotheses.

The invention also provides a circuit for determining a Doppler shift of a first signal. In one embodiment, the circuit comprises a Doppler signal generator, a correlator, and a controller. The Doppler signal generator combines a plurality of Doppler frequency hypotheses to obtain a joint Doppler signal. The correlator correlates the first signal according to the joint Doppler signal and a plurality of code signals with phases corresponding to a series of code phase hypotheses to obtain a series of correlation results. The controller examines the correlation results to determine whether the Doppler shift does lie in the Doppler hypotheses, and controls the Doppler signal generator and the correlator to perform a fine Doppler search to determine the Doppler shift when the Doppler shift lies in the Doppler hypotheses.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
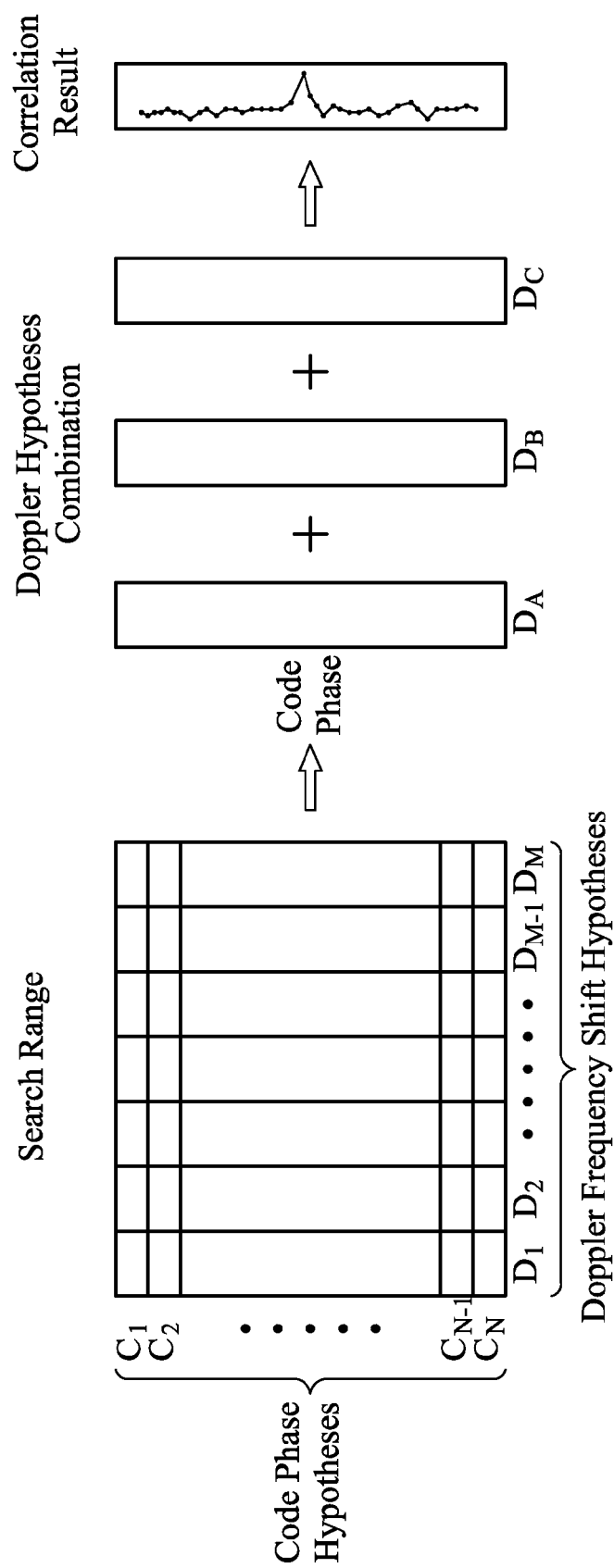
FIG. 1 is a schematic diagram of a concept for determining a Doppler frequency shift and a code phase according to the invention.

Referring to FIG. 1, a schematic diagram of a concept for determining a Doppler frequency shift and a code phase according to the invention is shown. A receiver receives a signal and must determine a Doppler frequency shift of the signal and the code phase shift of the incoming signal with respect to the local replica. A frequency range to be searched for the Doppler frequency shift is divided into M Doppler bins $D_1, D_2, \ldots, D_{M-1}, D_M$, and each stand for a Doppler shift hypothesis. Accordingly, a phase range to be searched for the code phase is divided into N code phase bins $C_1, C_2, \ldots, C_{N-1}, C_N$, and each stand for a code phase hypothesis. A combination of N code phase hypotheses and M Doppler shift hypotheses therefore forms the N×M combined hypotheses.

In a conventional method, the receiver must sequentially search all N×M combined hypotheses, requiring a lot of time and delaying subsequent signal processing. According to the invention, the receiver, however, searches multiple Doppler shift hypotheses selected from the Doppler shift at the same time. For example, three target Doppler shift hypotheses $D_A$, $D_B$, and $D_C$ are selected from the original Doppler shift hypotheses $D_1 \sim D_M$. The target Doppler shift hypotheses $D_A$, $D_B$, and $D_C$ can be arbitrarily selected without limitations. In one embodiment, original Doppler shift hypotheses corresponding to adjacent frequency regions are selected as the target Doppler shift hypotheses $D_A$, $D_B$, and $D_C$. In another embodiment, original Doppler shift hypotheses corresponding to discontinuous frequency regions are selected as the target Doppler shift hypotheses $D_A$, $D_B$, and $D_C$.

The target Doppler shift hypotheses are then combined together and searched at the same time to generate a series of correlation results. When the correlation results include a peak value greater than a threshold, the Doppler frequency shift of the received signal must conform to one of the target Doppler shift hypotheses $D_A$, $D_B$, and $D_C$. Otherwise, another three target Doppler shift hypotheses are then selected from the original Doppler shift hypotheses $D_1, D_2, \ldots, D_{M-1}, D_M$ and are searched again. The time required for searching all Doppler shift hypotheses $D_1 \sim D_M$ is therefore greatly reduced to advance the time of subsequent signal processing, and the performance of the receiver is improved.

Figure 2:
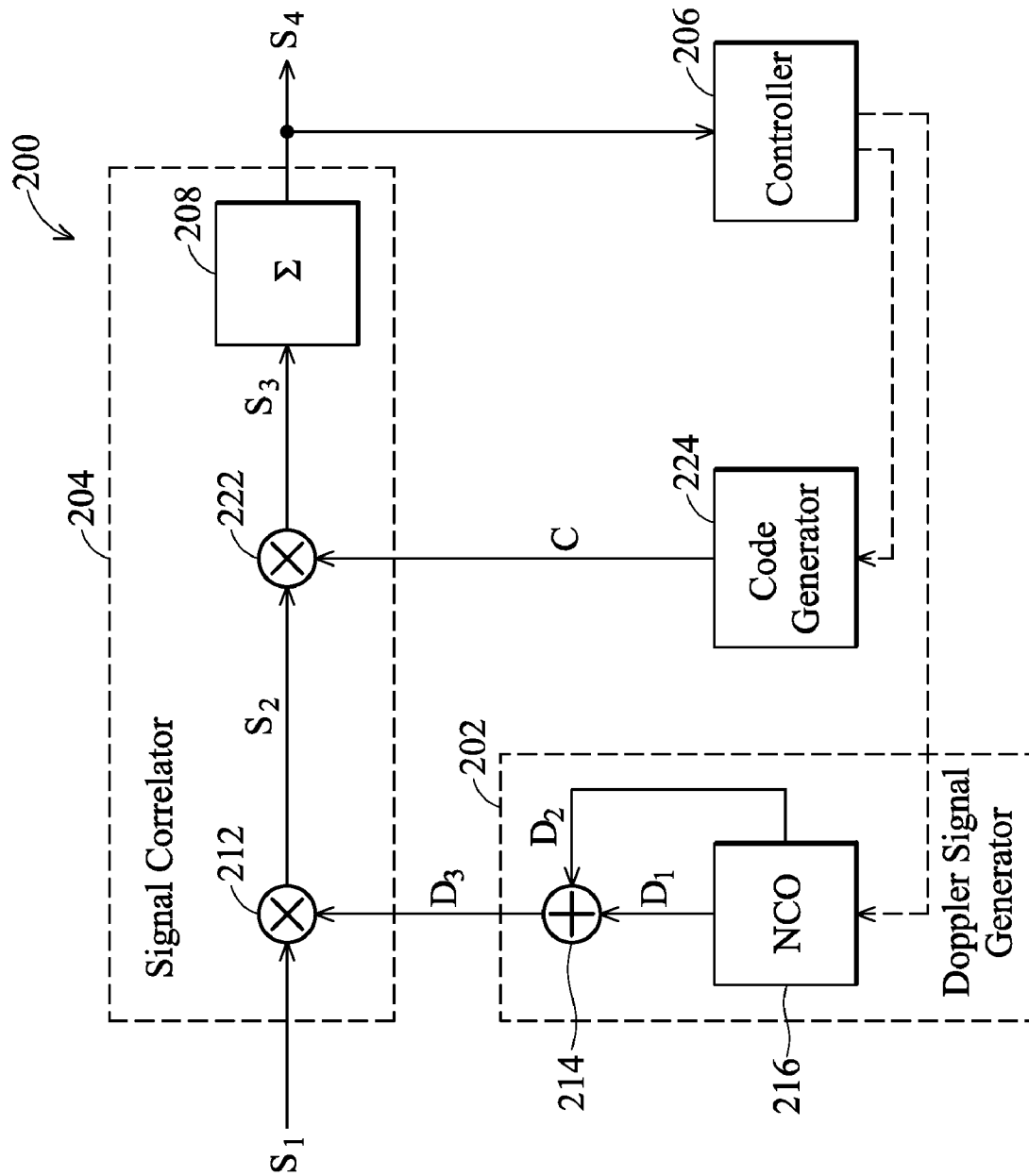
FIG. 2 is a block diagram of a circuit for determining a Doppler shift of a received signal according to the invention.
Figure 3:
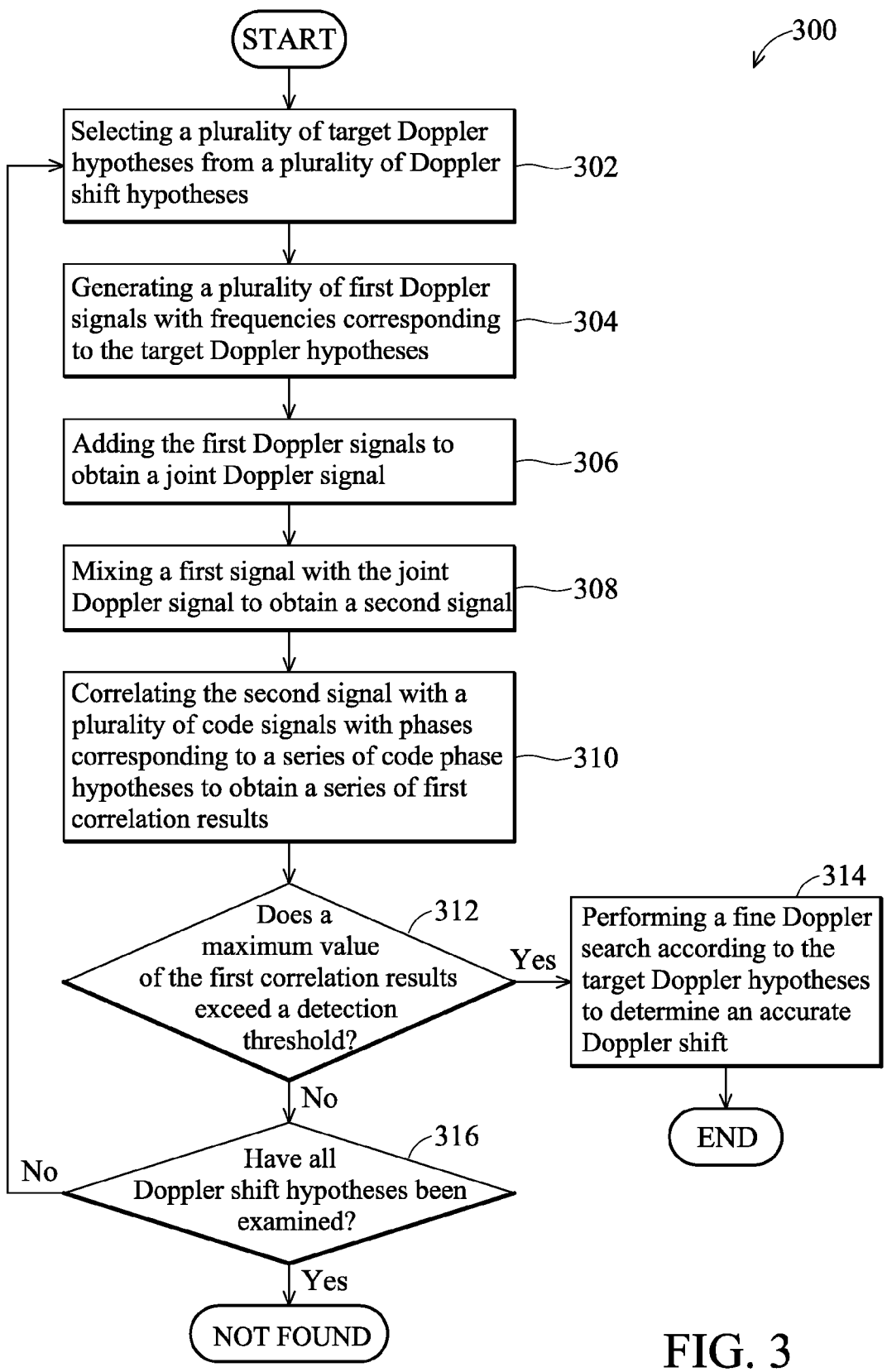
FIG. 3 is a flowchart of a method for determining a Doppler shift of a received signal according to the invention.

Referring to FIG. 2, a block diagram of a circuit 200 for determining a Doppler shift of a received signal according to the invention is shown. The circuit 200 comprises a Doppler signal generator 202, a signal correlator 204, a controller 206, and a code generator 224. The Doppler signal generator 202 combines a plurality of Doppler frequency hypotheses to obtain a joint Doppler signal $D_3$. In one embodiment, the Doppler signal generator 202 comprises a numerically-controlled-oscillator lookup table 216, and an adder 214. The code generator 224 generates a plurality of code signals C with phases corresponding to a series of code phase hypotheses. The signal correlator 204 then correlates a first signal $S_1$ according to the joint Doppler signal $D_3$ and the code signals C to obtain a series of correlation results $S_4$. In one embodiment, the signal correlator 204 comprises a mixer 212, a correlator 222, and an integrator 208. In this embodiment, the mixer and the correlator are implemented by a multiplier. The controller 206 then examines the correlation results $S_4$ to determine whether the Doppler shift does lie in the Doppler hypotheses. If so, the controller 206 directs the Doppler signal generator 202 and the correlator 204 to perform a fine Doppler search to determine the Doppler shift. The circuit 200 operates according to a method 300 shown in FIG. 3 to determine a Doppler shift of a received signal $S_1$.

The Doppler signal generator 202 first selects multiple target Doppler hypotheses from a plurality of Doppler shift hypotheses $D_1 \sim D_M$ (step 302). For example, two target Doppler hypotheses are selected. The NCO lookup table 216 then generates two Doppler signals $D_1$ and $D_2$ with frequencies corresponding to the target Doppler shift hypotheses (step 304). The adder 214 then combines the Doppler signals $D_1$ and $D_2$ together to obtain a joint Doppler signal $D_3$ (step 306). When the Doppler signals $D_1$ and $D_2$ are added together, the bit number of the joint Doppler signal $D_3$ may be greater than the original bit numbers of the Doppler signals $D_1$ and $D_2$. To keep the bit number of the joint Doppler signal $D_3$ the same as that of the Doppler signals $D_1$ and $D_2$, the Doppler signal generator 202 may comprise a rounding module, coupled between the adder 214 and the first multiplier 212, rounding the extra 1 bit of the joint Doppler signal $D_3$. In another embodiment, the rounding module modifies the bit number of the joint Doppler signal $D_3$ to a predetermined bit number.

The first multiplier 212 of the signal correlator 204 then mixes the received signal $S_1$ with the joint Doppler signal $D_3$ generated by the Doppler signal generator 202 to obtain the signal $S_2$ (step 308). The code generator 224 then generates a plurality of code signals C with phases corresponding to a series of code phase hypotheses $C_1, C_2, \ldots, C_{N-1}, C_N$. The second multiplier 222 of signal correlator 204 then correlates the signal $S_2$ with the plurality of code signals C to obtain a plurality of signals $S_3$. The integrator 208 of the signal correlator 204 then respectively integrates the signals $S_3$ to obtain a series of correlation results $S_4$ corresponding to the series of code phase hypotheses $C_1, C_2, \ldots, C_{N-1}, C_N$ (step 310).

The controller 206 then detects whether a maximum value of the correlation results $S_4$ exceeds a threshold (step 312). When the maximum value of the correlation results $S_4$ exceeds the threshold, a peak of the correlation results $S_4$ occurs. The code phase of the received signal $S_1$ is then identified as the code phase hypothesis corresponding to the peak of the correlation result, and the controller 206 determines that the Doppler shift of the received signal $S_1$ lays in a union of the target Doppler hypotheses. The controller 206 therefore directs the Doppler signal generator 202 and the signal correlator 204 to perform a fine Doppler search to search the target Doppler hypotheses for the accurate Doppler shift (step 314). The procedure of the fine Doppler search is further explained in detail with FIG. 4. When the maximum value of the correlation results $S_4$ does not exceed the threshold, a peak of the correlation results $S_4$ does not occur. The controller 206 then directs the Doppler signal generator 202 to select other target Doppler hypotheses from the remaining Doppler shift hypotheses (step 302), and the steps 304~312 are repeated again with the newly selected target Doppler hypotheses until a peak of the correlation results occurs (step 312) or all Doppler shift hypotheses are examined (step 316).

Figure 5A:
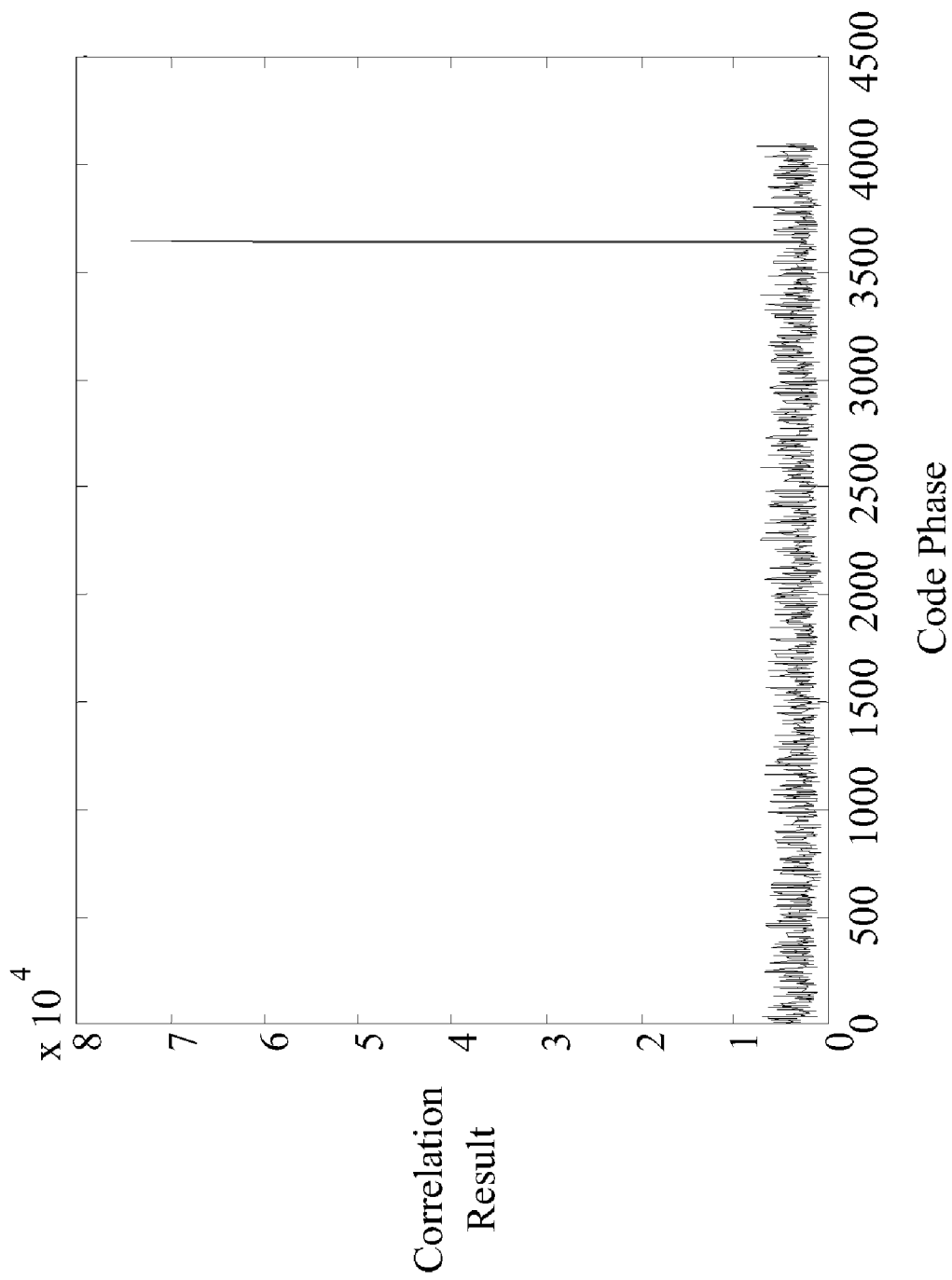
FIG. 5A shows a series of correlation results generated according to a conventional method.
Figure 5B:
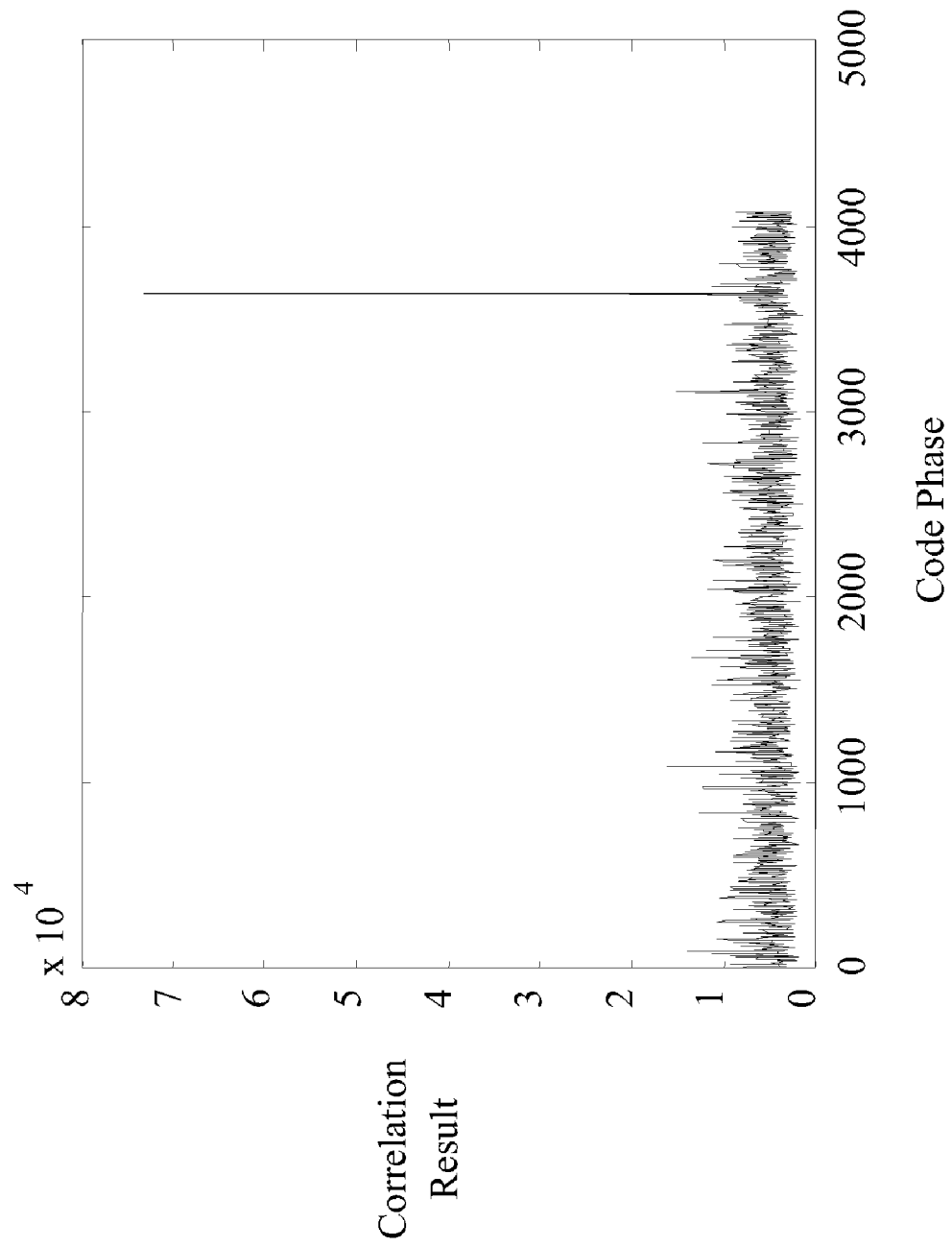
FIG. 5B shows a series of correlation results generated by the circuit of FIG. 2 according to the invention.

Referring to FIGS. 5A and 5B, FIG. 5A shows a series of correlation results of multiple code hypotheses generated according to a conventional method, and FIG. 5B shows a series of correlation results $S_4$ generated by the circuit 200 of FIG. 2. Comparing the correlation results $S_4$ of FIG. 5B with the correlation results of FIG. 5A, it can be seen that the correlation results generated according to the invention has the same peak location as the correlation results generated according to the conventional method. The only difference is that the noise level of the correlation results of FIG. 5B is greater than that of the correlation results of FIG. 5A. The peak level, however, is much greater than the noise level and does not affect identification of the peak.

Figure 4:
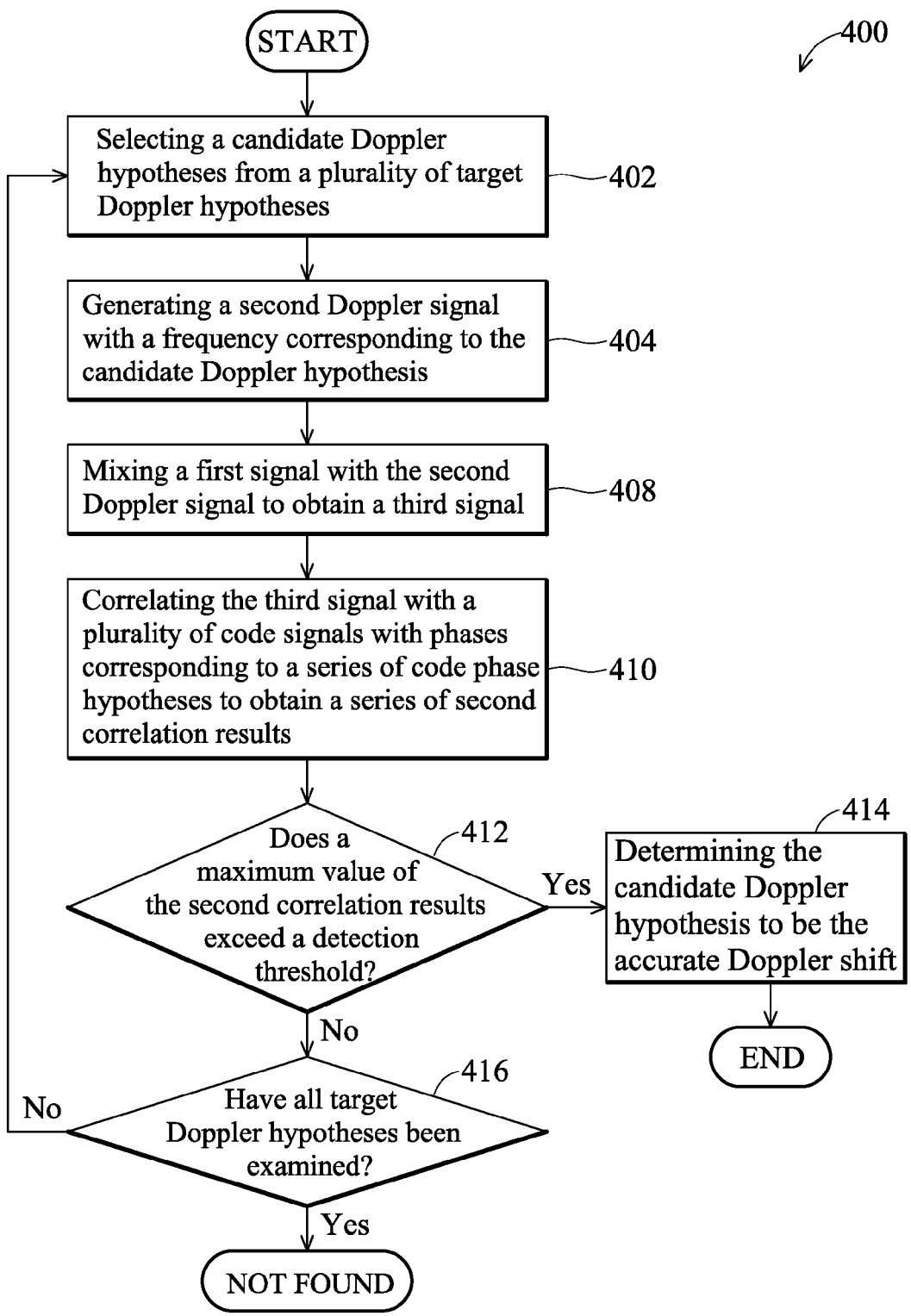
FIG. 4 is a flowchart of a method for performing a fine Doppler search according to the invention.

Referring to FIG. 4, a flowchart of a method 400 for performing a fine Doppler search according to the invention is shown. The circuit 200 operates according to the method 400 to determine which of the target Doppler hypotheses matches the Doppler shift of the signal $S_1$. Accordingly, the controller 206 first directs the Doppler signal generator 202 to select a candidate Doppler frequency hypothesis from the plurality of target Doppler hypotheses obtained according to method 300 (step 402). The NCO lookup table 216 then generates a Doppler signal $D_1$ with a frequency corresponding to the candidate Doppler frequency hypothesis (step 404). After the Doppler signal $D_1$ is directly forwarded to the signal correlator 204 as the Doppler signal $D_3$, the first multiplier 212 mixes the received signal $S_1$ with the Doppler signal $D_3$ to obtain the signal $S_2$ (step 408).

The code generator 224 then generates a plurality of code signals C with phases corresponding to a series of code phase hypotheses $C_1, C_2, \ldots, C_{N-1}, C_N$. The second multiplier 222 of the signal correlator 204 then correlates the signal $S_2$ with the plurality of code signals C to obtain a plurality of signals $S_3$. The integrator 208 then respectively integrates the signals $S_3$ to obtain a series of correlation results $S_4$ corresponding to the series of code phase hypotheses $C_1, C_2, \ldots, C_{N-1}, C_N$ (step 410).

The controller 206 then detects whether a maximum value of the correlation results $S_4$ exceeds a threshold (step 412). When the maximum value of the correlation results $S_4$ exceeds the threshold, a peak of the correlation results $S_4$ occurs. The controller 206 then determines that the candidate Doppler frequency hypothesis matches the Doppler shift of the signal $S_1$, and the controller 206 determines that the Doppler shift of the received signal $S_1$ is a frequency corresponding to the candidate Doppler frequency hypothesis (step 414). Otherwise, when the maximum value of the correlation results $S_4$ does not exceed the threshold, a peak of the correlation results $S_4$ does not occur. The controller 206 then directs the Doppler signal generator 202 to select another candidate Doppler frequency hypothesis from the remaining target Doppler hypotheses (step 402), and the steps 404-412 are repeated again with the newly selected candidate Doppler frequency hypothesis until a peak of the correlation results occurs (step 412) or all target Doppler hypotheses are examined (step 416).

Figure 6:
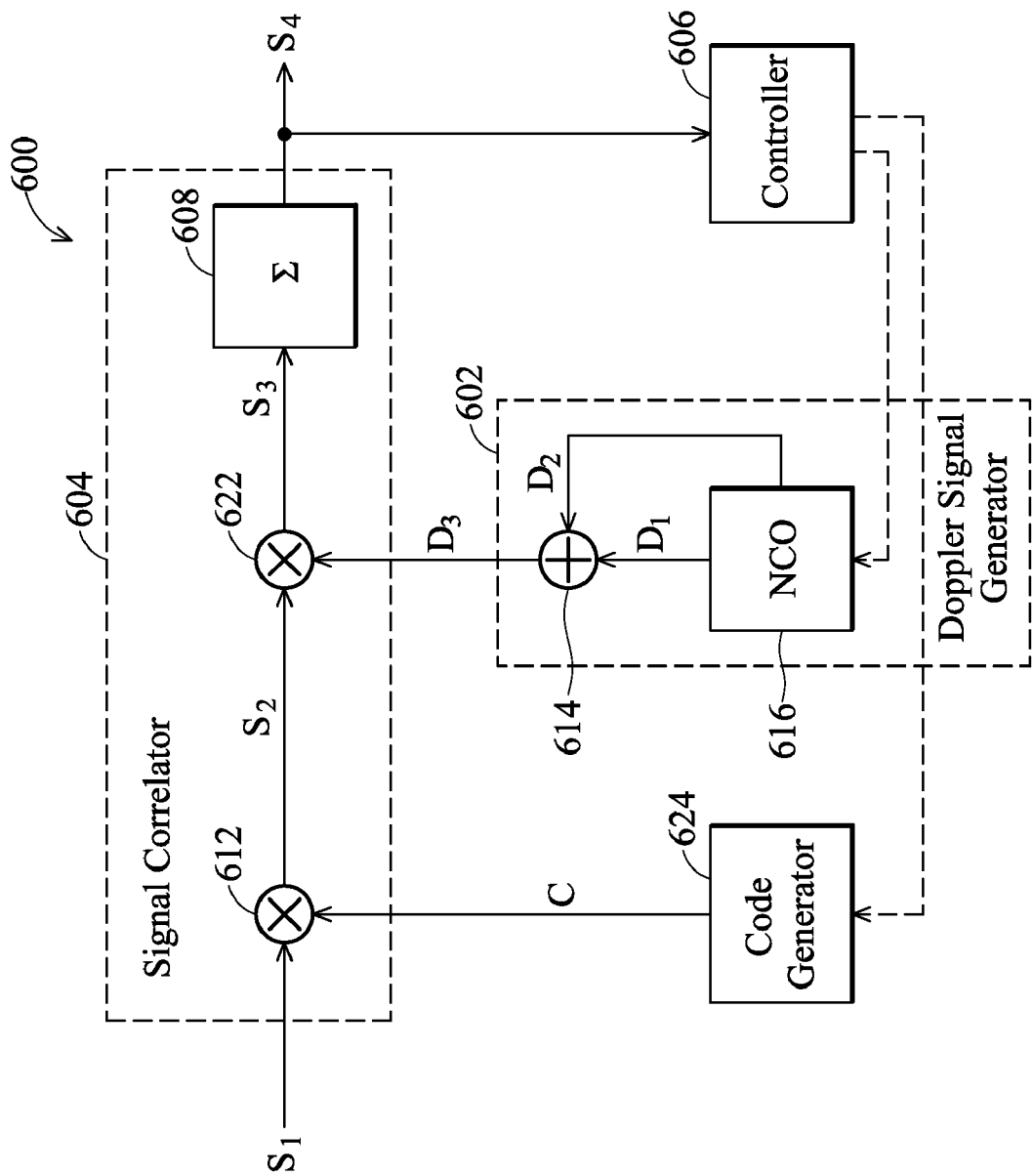
FIG. 6 is a block diagram of another circuit for determining a Doppler shift of a received signal according to the invention.

Referring to FIG. 6, a block diagram of another circuit 600 for determining a Doppler shift of a received signal according to the invention is shown. The circuit 600 is similar to the circuit 200 of FIG. 2 and operates according to the methods 200 and 400 to determine a Doppler shift and a code phase of a received signal $S_1$. The circuit 600 accordingly comprises a Doppler signal generator 602, a correlator 604, a controller 606, and a code generator 624, except that the code generator 624 is coupled to the first multiplier 622 of the signal correlator 604, and the Doppler signal generator 602 is coupled to the second multiplier 612 of the signal correlator 604. The signal correlator 604 first removes code C with phases corresponding to a series of code phase hypotheses from the signal $S_1$ to obtain a series of signals $S_2'$. The Doppler signal generator 602 then generates a joint Doppler signal $D_3$ corresponding to multiple target Doppler shift hypotheses (steps 302~306), and the signal correlator 604 then removes frequency components of the joint Doppler signal $D_3$ from the series of signals $S_2'$ to obtain a series of signals $S_3$ (step 308). Finally, the integrator 608 of the signal correlator 604 respectively integrates the series of signals $S_3$ to obtain a series of correlation results, and the controller 606 detects whether a peak of the correlation results $S_4$ occurs (step 312) to determine whether the Doppler shift of the signal $S_1$ does lie in the union of the target Doppler hypotheses. If so, the controller 606 directs the Doppler signal generator 602 and the signal correlator 604 to perform a fine Doppler search according to the method 400 to determine which of the target Doppler hypotheses matches the Doppler shift of the signal $S_1$ (step 314).

The invention provides a method for determining a Doppler shift of a signal received by a receiver. A plurality of signals with frequencies corresponding to a plurality of Doppler shift hypotheses are added to form a joint Doppler signal, and the received signal is then mixed with the joint Doppler signal to remove frequency components corresponding to the multiple Doppler shift hypotheses from the received signal. The multiple Doppler shift hypotheses can therefore be examined at the same time, and the time required for examining all Doppler shift hypotheses is therefore reduced. Thus, the time for performing the subsequent signal processing is advanced to improve the performance of the receiver.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, executed by a processor, for determining a Doppler shift of a first signal, comprising:
   combining a plurality of Doppler frequency hypotheses to obtain a joint Doppler signal, wherein the combining step further comprises:
     selecting a plurality of target Doppler hypotheses from a plurality of Doppler shift hypotheses;
     generating a plurality of first Doppler signals with frequencies corresponding to the target Doppler hypotheses; and
     combining the first Doppler signals to obtain a joint Doppler signal; and
   correlating the first signal according to the joint Doppler signal and a plurality of code signals with phases corresponding to a union of code phase hypotheses to obtain a series of first correlation results which are then examined to determine whether the Doppler shift does lie in the Doppler hypotheses.

2. The method as claimed in claim 1, wherein the correlating step comprises:
   mixing the first signal with the joint Doppler signal to obtain a second signal;
   correlating the second signal with the plurality of code signals with phases corresponding to the series of code phase hypotheses to obtain a plurality of third signals;
   integrating the third signals to obtain the series of first correlation results;
   detecting whether a maximum value of the first correlation results exceed a threshold; and
   determining that the Doppler shift does lie in the Doppler hypotheses when the maximum value exceeds the threshold.

3. The method as claimed in claim 1, wherein the correlating step comprises:
   correlating the first signal with the plurality of code signals with phases corresponding to the series of code phase hypotheses to obtain a plurality of fourth signals;
   mixing the fourth signals with the joint Doppler signal to obtain a plurality of fifth signals;
   integrating the fifth signals to obtain the series of first correlation results;
   detecting whether a maximum value of the first correlation results exceed a threshold; and
   determining that the Doppler shift lies in the Doppler hypotheses when the maximum value exceeds the threshold.

4. The method as claimed in claim 1, further comprising:
   performing a fine Doppler search to determine the Doppler shift when the Doppler shift lies in the Doppler hypotheses; generating a candidate Doppler signal with a candidate Doppler frequency hypothesis selected from the Doppler hypotheses;
   correlating the first signal according to the candidate Doppler signal and a plurality of code signals with phases corresponding to a union of code phase hypotheses to obtain a series of second correlation results which are then examined to determine whether the candidate Doppler frequency hypothesis matches the Doppler shift; and
   determining the Doppler shift to be a frequency of the candidate Doppler frequency hypothesis when the candidate Doppler frequency hypothesis matches the Doppler shift.

5. The method as claimed in claim 1, wherein the method further comprises rounding the joint Doppler signal to keep a bit number of the joint Doppler signal the same as that of the first Doppler signals.

6. The method as claimed in claim 1, wherein a plurality of Doppler hypotheses corresponding to adjacent frequency regions are selected from the Doppler shift hypotheses as the target Doppler hypotheses.

7. The method as claimed in claim 1, wherein a plurality of Doppler hypotheses corresponding to discontinuous frequency regions are selected from the Doppler shift hypotheses as the target Doppler hypotheses.

8. The method as claimed in claim 1, further comprising: modifying a bit number of the first Doppler signals to a predetermined bit number.

9. A circuit for determining a Doppler shift of a first signal, comprising:
- a Doppler signal generator for combining a plurality of Doppler frequency hypotheses to obtain a joint Doppler signal, wherein the Doppler signal generator selects a plurality of target Doppler hypotheses from a plurality of Doppler shift hypotheses, generates a plurality of first Doppler signals with frequencies corresponding to the target Doppler hypotheses, and combing the first Doppler signals to obtain a joint Doppler signal;
- a correlator for correlating the first signal according to the joint Doppler signal and a plurality of code signals with phases corresponding to a series of code phase hypotheses to obtain a series of first correlation results; and
- a controller for examining the correlation results to determine whether the Doppler shift does lie in the Doppler hypotheses.

10. The circuit as claimed in claim 9, wherein the circuit further comprises a code generator, generating the plurality of code signals with phases corresponding to the series of code phase hypotheses.

11. The circuit as claimed in claim 9, wherein the correlator comprises:
- a first correlator, mixing the first signal with the joint Doppler signal to obtain the second signal;
- a second correlator, correlating the second signal with the plurality of code signals to obtain a plurality of third signals; and
- an integrator, integrating the third signals to obtain the series of first correlation results.

12. The circuit as claimed in claim 9, wherein the controller detects whether a maximum value of the first correlation results exceed a threshold, and determines that the Doppler shift lies in the Doppler hypotheses when the maximum value exceeds the threshold.

13. The circuit as claimed in claim 9, wherein the correlator comprises:
- a first correlator, correlating the first signal with the plurality of code signals to obtain a plurality of fourth signals;
- a second correlator, mixing the fourth signals with the joint Doppler signal to obtain a plurality of fifth signals; and
- an integrator, integrating the fifth signals to obtain the series of first correlation results.

14. The circuit as claimed in claim 9, wherein the controller further controls the Doppler signal generator and the correlator to perform a fine Doppler search to determine the Doppler shift when the Doppler shift lies in the Doppler hypotheses, and when the fine search is performed, the controller directs the Doppler signal generator to generate a candidate Doppler signal with a candidate Doppler frequency hypothesis selected from the Doppler hypotheses, directs the correlator to correlate the first signal according to the candidate Doppler signal and a plurality of code signals with phases corresponding to a series of code phase hypotheses to obtain a series of second correlation results, examines the second correlation results to determine whether the candidate Doppler frequency hypothesis matches the Doppler shift, and determines the Doppler shift to be a frequency of the candidate Doppler frequency hypothesis when the candidate Doppler frequency hypothesis matches the Doppler shift.

15. The circuit as claimed in claim 9, wherein the Doppler signal generator comprises a rounding module, coupled between the NCO lookup table and an adder, rounding the joint Doppler signal to keep a bit number of the joint Doppler signal the same as a predetermined bit number.

16. The circuit as claimed in claim 9, wherein the Doppler signal generator selects a plurality of Doppler hypotheses corresponding to adjacent frequency regions from the Doppler shift hypotheses as the target Doppler hypotheses.

17. The circuit as claimed in claim 9, wherein the Doppler signal generator selects a plurality of Doppler hypotheses corresponding to discontinuous frequency regions from the Doppler shift hypotheses as the target Doppler hypotheses.

18. The circuit as claimed in claim 9, wherein the Doppler signal generator comprises:
- a numerically-controlled-oscillator (NCO) lookup table, for generating the first Doppler signals with frequencies corresponding to the target Doppler hypotheses; and
- an adder, adding the first Doppler signals to obtain a joint Doppler signal.

* * * * *